United States Patent
Erez

(10) Patent No.: US 7,434,062 B2
(45) Date of Patent: Oct. 7, 2008

(54) PASSWORD ENCRYPTING APPARATUS AND METHOD FOR ENCRYPTING PASSWORD

(75) Inventor: Chet Erez, San Jose, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 720 days.

(21) Appl. No.: 10/992,309

(22) Filed: Nov. 19, 2004

(65) Prior Publication Data

US 2006/0112270 A1    May 25, 2006

(51) Int. Cl.
*H04K 1/00* (2006.01)

(52) U.S. Cl. .................. 713/184; 713/164; 713/169; 713/172; 713/182; 713/183; 726/5; 726/6; 726/18; 705/18

(58) Field of Classification Search ......... 713/183–184, 713/164, 169, 172, 182; 705/18; 726/5, 726/6, 18
See application file for complete search history.

(56) References Cited

U.S. PATENT DOCUMENTS

| | | | |
|---|---|---|---|
| 5,177,789 A * | 1/1993 | Covert | 713/184 |
| 6,904,526 B1 * | 6/2005 | Hongwei | 713/182 |
| 7,103,912 B2 * | 9/2006 | Xia et al. | 726/8 |
| 2003/0016821 A1 * | 1/2003 | Hammersmith | 380/37 |
| 2003/0026429 A1 * | 2/2003 | Hammersmith | 380/277 |
| 2003/0105964 A1 * | 6/2003 | Brainard et al. | 713/178 |
| 2005/0251451 A1 * | 11/2005 | Tan et al. | 705/18 |

* cited by examiner

*Primary Examiner*—Kimyen Vu
*Assistant Examiner*—Beemnet W Dada
(74) *Attorney, Agent, or Firm*—Finnegan, Henderson, Farabow, Garrett & Dunner, L.L.P.

(57) ABSTRACT

The present application relates to a method and an apparatus of encrypting and/or decrypting password to secure secrecy of the password.

6 Claims, 11 Drawing Sheets

| $D_{(33)}$ | 56 | 49 | 3  | 68 | 45 | 59 | 28 | 46 | 37 |
|------------|----|----|----|----|----|----|----|----|----|
| 16         | 0  | 32 | 17 | 4  | 71 | 20 | 60 | 19 | 58 |
| 70         | 72 | 42 | 69 | 14 | 15 | 53 | 51 | 12 | 76 |
| 34         | 2  | 1  | 31 | 54 | 40 | 5  | 21 | 13 | 38 |
| 57         | 55 | 44 | 62 | 61 | 23 | 39 | 22 | 29 | 50 |
| 35         | 65 | 24 | 6  | 25 | 18 | 67 | 66 | 52 | 9  |
| 43         | 79 | 63 | 7  | 74 | 26 | 27 | 10 | 95 | 41 |
| 64         | 8  | 36 | 48 | 73 | 47 | 78 | 30 | 11 | 77 |

Fig.3

| D(33) | 56 | 49 | 3  | G(68) | 45 | 59 | 28 | 46 | 37 |
|-------|----|----|----|-------|----|----|----|----|----|
| 16    | 0  | 32 | 17 | 4     | 71 | 20 | 60 | 19 | 58 |
| 70    | 72 | 42 | 69 | 14    | 15 | 53 | 51 | 12 | 76 |
| 34    | 2  | 1  | 31 | 54    | 40 | 5  | 21 | 13 | 38 |
| 57    | 55 | 44 | 62 | 61    | 23 | 39 | 22 | 29 | 50 |
| 35    | 65 | 24 | 6  | 25    | 18 | 67 | 66 | 52 | 9  |
| 43    | 79 | 63 | 7  | 74    | 26 | 27 | 10 | 95 | 41 |
| 64    | 8  | 36 | 48 | 73    | 47 | 78 | 30 | 11 | 77 |

Fig.4

| D(33) | 56 | 49 | 3  | G(68) | A(45) | B(59) | C(28) | D(46) | E(37) |
|-------|----|----|----|-------|-------|-------|-------|-------|-------|
| F(16) | 0  | 32 | 17 | 4     | 71    | 20    | 60    | 19    | 58    |
| 70    | 72 | 42 | 69 | 14    | 15    | 53    | 51    | 12    | 76    |
| 34    | 2  | 1  | 31 | 54    | 40    | 5     | 21    | 13    | 38    |
| 57    | 55 | 44 | 62 | 61    | 23    | 39    | 22    | 29    | 50    |
| 35    | 65 | 24 | 6  | 25    | 18    | 67    | 66    | 52    | 9     |
| 43    | 79 | 63 | 7  | 74    | 26    | 27    | 10    | 95    | 41    |
| 64    | 8  | 36 | 48 | 73    | 47    | 78    | 30    | 11    | 77    |

Fig.5

| 0 | 1 | 2 | 3 | 4 | 5 | 6 | 7 | 8 | 9 |
|---|---|---|---|---|---|---|---|---|---|
| 10 | 11 | 12 | 13 | 14 | 15 | 16 | 17 | 18 | 19 |
| 20 | 21 | 22 | 23 | 24 | 25 | 26 | 27 | 28 | 29 |
| 30 | 31 | 32 | 33 | 34 | 35 | 36 | 37 | 38 | 39 |
| 40 | 41 | 42 | 43 | 44 | 45 | 46 | 47 | 48 | 49 |
| 50 | 51 | 52 | 53 | 54 | 55 | 56 | 57 | 58 | 59 |
| 60 | 61 | 62 | 63 | 64 | 65 | 66 | 67 | 68 | 69 |
| 70 | 71 | 72 | 73 | 74 | 75 | 76 | 77 | 78 | 79 |

Fig.6

| 0 | 1 | 2 | 3 | 4 | 5 | 6 | 7 | 8 | 9 |
|---|---|---|---|---|---|---|---|---|---|
|   |   |   |   |   |   |   |   |   |   |
| 10 | 11 | 12 | 13 | 14 | 15 | 16 | 17 | 18 | 19 |
|   |   |   |   |   |   | F |   |   |   |
| 20 | 21 | 22 | 23 | 24 | 25 | 26 | 27 | 28 | 29 |
|   |   |   |   |   |   |   |   | C |   |
| 30 | 31 | 32 | 33 | 34 | 35 | 36 | 37 | 38 | 39 |
|   |   |   | D |   |   |   | E |   |   |
| 40 | 41 | 42 | 43 | 44 | 45 | 46 | 47 | 48 | 49 |
|   |   |   |   |   | A | D |   |   |   |
| 50 | 51 | 52 | 53 | 54 | 55 | 56 | 57 | 58 | 59 |
|   |   |   |   |   |   |   |   |   | B |
| 60 | 61 | 62 | 63 | 64 | 65 | 66 | 67 | 68 | 69 |
|   |   |   |   |   |   |   |   | G |   |
| 70 | 71 | 72 | 73 | 74 | 75 | 76 | 77 | 78 | 79 |
|   |   |   |   |   |   |   |   |   |   |

Fig.7

| 0 | 1 | 2 | 3 | 4 | 5 | 6 | 7 | 8 | 9 |
|---|---|---|---|---|---|---|---|---|---|
| B | A | E | E | B | G | B | I | G | B |
| 10 | 11 | 12 | 13 | 14 | 15 | 16 | 17 | 18 | 19 |
| I | I | A | F | H | G | F | C | G | G |
| 20 | 21 | 22 | 23 | 24 | 25 | 26 | 27 | 28 | 29 |
| E | A | E | D | D | F | B | J | C | I |
| 30 | 31 | 32 | 33 | 34 | 35 | 36 | 37 | 38 | 39 |
| F | G | B | D | J | D | C | E | E | C |
| 40 | 41 | 42 | 43 | 44 | 45 | 46 | 47 | 48 | 49 |
| C | I | H | C | H | A | D | D | J | C |
| 50 | 51 | 52 | 53 | 54 | 55 | 56 | 57 | 58 | 59 |
| F | J | C | A | F | E | J | A | D | B |
| 60 | 61 | 62 | 63 | 64 | 65 | 66 | 67 | 68 | 69 |
| I | H | G | H | H | J | F | I | G | H |
| 70 | 71 | 72 | 73 | 74 | 75 | 76 | 77 | 78 | 79 |
| F | E | A | J | H | J | I | D | A | B |

US 7,434,062 B2

PASSWORD ENCRYPTING APPARATUS AND METHOD FOR ENCRYPTING PASSWORD

FIELD

The present invention relates to a method and an apparatus of encrypting and/or decrypting a password.

INTRODUCTION

In order to control and manage common resources (e.g., a printer and the like) incorporated in a computer network system, Lightweight Directory Access Protocol (LDAP) is widely adopted as protocol of Transmission Control Protocol/Internet Protocol (TCP/IP) network.

However, if a computer network incorporating a LDAP server is used under the environment of Hyper Text Transfer Protocol (HTTP), even secret information such as a password is transferred in clear text. Therefore, such transfer of password in such network exhibits certain drawback. That is to say, it is difficult to secure of secrecy of the password.

Therefore, it is desirable to secure the secrecy of the password transferred through the computer network system under the non-security environment such as HTTP environment.

SUMMARY

According to various embodiments, the present teachings can provide a password encrypting apparatus which encrypts a password. The password encrypting apparatus can comprise a storing device. The storing device can store at least following five kinds of data. I) Data of password characters. The password characters are characters can be used for the password. II) Data of M. M represents number of kinds of the password characters. III) Data of correlation between each of the password characters and each number which is 0 to (M−1). IV) Data of an encryption table. The encryption table is filled with numbers which are from 0 to ((M×N)−1) in random order. N represents number of (B+2) and is equal to or less than M. B represents number of maximum password length. V) Data of output digits. The output digits are the sequential numbers which are from 0 to ((M×N)−1). The password encrypting apparatus further can comprise an input device which can input the password. The password encrypting apparatus further can comprise a password length detecting device which can detect C that represents the number of length of the password input by the input device. The password encrypting apparatus further can comprise an establishing device which can establish A that represents number which is from 0 to (M−1) in random. The password encrypting apparatus further can comprise a converting device. The converting device convert A into a corresponding character A' according to the correlation, and convert C into a corresponding character C' according to the correlation. The password encrypting apparatus further can comprise an encrypted character list producing device. The encrypted character list producing device can produce an encrypted character list by at least the following five steps. I) A step of assigning A' to one output digit which corresponds to the first number of the encryption table. II) A step of assigning C' to other output digit which corresponds to the (A+2)th number of the encryption table. III) A step of assigning the first character of the password to other output digit which corresponds to the (A+3)th number of the encryption table. IV) A step of assigning all of the characters of the password other than the first character, which are the second character, the third character . . . and the last character of the password to other output digits which correspond to (A+4)th number, (A+5)th number . . . and (A+C+2)th number of the encryption table. V) A step of assigning all kinds of the password characters to all of the unassigned output digits in random so that the number of each kind of the password characters assigned is equal to N. The password encrypting apparatus further can comprise a transfer device which can transfer the encrypted character list to another apparatus.

BRIEF DESCRIPTION OF THE DRAWINGS

FIG. 3 illustrates an encryption table assigning A' to the first number of the encryption table, according to certain embodiments.

FIG. 4 illustrates an encryption table assigning C' to the (A+2)th number of the encryption table, according to certain embodiments.

FIG. 5 illustrates an encryption table assigning password characters to the (A+3)th, (A+4)th . . . (A+C+2)th number of the encryption table, according to certain embodiments.

FIG. 6 illustrates an encrypted character list in which no password character is assigned to output digits, according to certain embodiments.

FIG. 7 illustrates an encrypted character list in which the password characters, A' and C' are assigned to output digits, according to certain embodiments.

DESCRIPTION OF CERTAIN EMBODIMENTS

Process of Encrypting a Password

Figure 1:
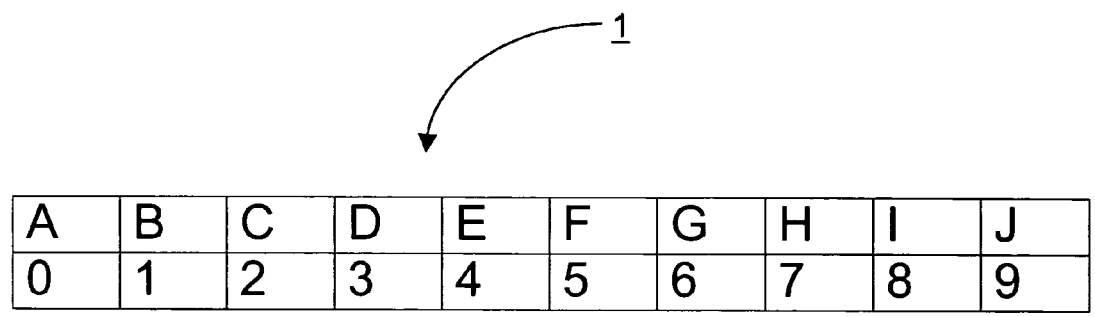
FIG. 1 illustrates a correlation between each of password characters and numbers, according to certain embodiments.

In certain embodiments, a method for encrypting a password by a computer can comprise the following steps. I) A step of establishing password characters. The password characters can be characters which can be used for the password. II) A step of establishing M. M can represent number of kinds of the password characters. III) A step of establishing B and N. B can represent number of maximum password length. N can represent number of (B+2) and be equal to or less than M. IV) A step of correlating each of the password characters to each number which is 0 to (M−1). V) A step of building an encryption table. The encryption table can be filled with numbers which are from 0 to ((M×N)−1) in random order. VI) A step of deciding the password. VII) A step of detecting C. C can represent the number of length of the decided password. VIII) A step of establishing A. A can represent number which is from 0 to (M−1) in random. IX) A step of converting A into a corresponding character A' according to the result of correlating step IV). X) A step of converting C into a corresponding character C' according to the result of correlating step IV). XI) A step of establishing output digits. The output digits can be the sequential numbers which are from 0 to ((M×N)−1). XII) A step of assigning A' to one output digit which corresponds to the first number of the encryption table. XIII) A step of assigning C' to other output digit which corresponds to the (A+2)th number of the encryption table. XIV) A step of assigning the first character of the password to other output digit which corresponds to the (A+3)th number of the encryption table. XV) A step of assigning all of the characters of the password other than the first character, which are the second character, the third character . . . and the last character of the password to other output digits which correspond to (A+4)th number, (A+5)th number . . . and (A+C+2)th number of the encryption table. XVI) A step of completing an encrypted character list by assigning all kinds of the password characters to all of the unassigned output digits in random so that the number of each kind of the password characters assigned is equal to N. XVI) A step of transferring of the encrypted character list as digital data to another apparatus.

In certain embodiments, the above steps from I) to XVI) can be conducted by a computer, a server, a printer comprising a central processing unit (CPU), a printer controller for the printer, a network system comprising a computer and the like. In certain embodiments, the above steps from I) to XVI) can be conducted by only one apparatus or several apparatuses which are separated.

In certain embodiments, the above steps from I) to XVI) can be conducted by a computer program. In certain embodiments, the computer program to conduct the above steps from I) to XVI) can be only one program or several program which are separated. In certain embodiments, the computer program to conduct the above steps from I) to XVI) can be recorded in a compact disk (CD) (e.g., CD-ROM, CD-R, CD-RW etc.), a digital versatile disk (DVD) (e.g., DVD-ROM, DVD-R, DVD-RW, DVD+RW etc.), a hard disk or the like. In certain embodiments, the computer program to conduct the above steps from I) to XVI) can be transferred through a network such as an internet or a local area network (LAN) and so on.

In certain embodiments, in the step I), the password characters can be established. The password characters can be characters which can be used for the password. Examples of the password characters consistent with certain embodiments of the invention include, but not limited to, alphabets, numbers, Greek alphabets, Japanese characters and Chinese characters. In certain embodiments, any number of kinds of the password characters can be chosen. For instance, if the password characters are only alphabets, the number of kinds of the password characters can be chosen among the numbers from 2 to 26. In certain embodiments, the password characters can be established as "A", "B", "C", "D", "E", "F", "G", "H", "I", and "J".

In certain embodiments, in the step II), M can be established. M can represent number of kinds of the password characters. In certain embodiments, M is 10, if the password characters are established as as "A", "B", "C", "D", "E", "F", "G", "H", "I", and "J".

In certain embodiments, in the step III), B and N can be established. B can represent number of maximum password length. N can be represent number of (B+2). In certain embodiments, B can be 6 and N can be 8. N can be equal to or less than M. In certain embodiments, if M is 10, N is equal or less than 10 and B is equal or less than 8. In certain embodiments, user can select any number which is from 1 to M−2 as B arbitrarily.

In certain embodiments, in the step IV), each of the password characters can be correlated to each number which is 0 to (M−1). In certain embodiments, as illustrated in FIG. 1, the password characters (as "A", "B", "C", "D", "E", "F", "G", "H", "I", and "J") can be correlated to each numbers which is 0 to 9 because M is 10 and (M−1) is 9 and the correlation 1 can be established.

Figure 2:
FIG. 2 illustrates an encryption table, according to certain embodiments.

In certain embodiments, in the step V), the encryption table can be built. In certain embodiments, if M is 10 and N is 8, ((M×N)−1) is 79 and the encryption table can be built, as illustrated in FIG. 2, by filling the encryption table 2 with the numbers from 0 to 79 in random.

In certain embodiments, in the step VI), the password can be decided. In certain embodiments, user can decide any password arbitrarily by combining the password characters established in the step I) of which numbers of characters of the password is B at most. In certain embodiments, the password can be decided as "ABCDEF" if the password characters are established as as "A", "B", "C", "D", "E", "F", "G", "H", "I", and "J" and B is established as 6.

In certain embodiments, in the step VII), C can be detected. C can represent the number of length of the decided password. In certain embodiments, C can be detected as 6 if the password is "ABCDEF".

In certain embodiments, in the step VIII), A can be established. A can represent number which is from 0 to (M−1) in random. In certain embodiments, A can be from 0 to 9 if M is 10. In certain embodiments, A can be established as 3 as a result of random establishing when M is 10.

In certain embodiments, in the step IX), A can be converted into a corresponding character A' according to the result of the step IV). In certain embodiments, as illustrated in FIG. 1, if A is 3, 3 as A can be converted into "D" as A' according to the correlation 1.

In certain embodiments, in the step X), C can be converted into a corresponding character C' according to the result of the step IV). In certain embodiments, as illustrated in FIG. 1, if the password is "ABCDEF" and C is detected as 6, 6 as C can be converted into "G" as C' according to the correlation 1.

In certain embodiments, in the step XI), output digits can be established. The output digits can be the sequential numbers which are from 0 to ((M×N)−1). In certain embodiments, as illustrated in FIG. 6, output digits can be the sequential numbers which are from 0 to 79 if M is 10 and N is 8 (B is 6).

In certain embodiments, in the step XII), A' can be assigned to one output digit which corresponds to the first number of the encryption table. In certain embodiments, as illustrated in FIG. 2, the $1^{st}$ number of the encryption table 2 is 33. In certain embodiments, as illustrated in FIG. 3, if A is established as 3 and A' is "D", "D" can be assigned to 33. In certain embodiments, as illustrated in FIG. 7, if A is established as 3 and A' is "D", "D" can be assigned to output digit 33.

In certain embodiments, in the step XIII), C' be assigned to one output digit which corresponds to the (A+2)th number of the encryption table. In certain embodiments, as illustrated in FIG. 2, if A is established as 3, the $5^{th}$ number as (A+2)th number of the encryption table 2 is 68. In certain embodiments, as illustrated in FIG. 4, if the password is decided as "ABCDEF", C is detected as 6, C' is "G" and A is established as 3, "G" can be assigned to "68". In certain embodiments, as illustrated in FIG. 7, "G" can be assigned to output digit of "68" if the password is decided as "ABCDEF", C is detected as 6, C' is "G" and A is established as 3.

In certain embodiments, in the step XIV), the first character of the password can be assigned to other output digit which corresponds to the (A+3)th number of the encryption table. In certain embodiments, as illustrated in FIG. 2, the (A+3)th number of the encryption table 2 is "45" if A is 3. In certain embodiments, as illustrated in FIG. 5, "A" which is the first character of the password "ABCDEF" can be assigned to 45 if A is 3. In certain embodiments, as illustrated in FIG. 7, "A"

which is the first character of the password "ABCDEF" can be assigned to output digit of 45 if A is 3.

In certain embodiments, in the step XV), all of the characters of the password other than the first character, which are the second character, the third character . . . and the last character of the password can be assigned to other output digits which correspond to (A+4)th number, (A+5)th number . . . and (A+C+2)th number of the encryption table. In certain embodiments, (A+4) is 7 and (A+C+2) is 11, if A is 3, the password is "ABCDEF" and C is 6. In certain embodiments, as illustrated in FIG. 2, if A is 3, the password is "ABCDEF" and C is 6, the (A+4)th number, the (A+5)th number . . . the (A+C+2)th number of the encryption table can be the $7^{th}$ number, $8^{th}$ number, $9^{th}$ number, $10^{th}$ number and $11^{th}$ number. And, $7^{th}$ number, $8^{th}$ number, $9^{th}$ number, $10^{th}$ number and $11^{th}$ number of the encryption table 2 is 59, 28, 46, 37 and 16. In certain embodiments, as illustrated in FIG. 5, if A is established as 3, the password is decided as "ABCDEF" and C is detected as 6, the second password character "B" can be assigned to 59, the third password character "C" can be assigned to 28, the fourth password character "D" can be assigned to 46, the fifth password character "E" can be assigned to 37 and the sixth password character "F" can be assigned to 16. In certain embodiments, as illustrated in FIG. 7, if A is established as 3, the password is "ABCDEF" and C is 6, the second password character "B" can be assigned to output digit 59, the third password character "C" can be assigned to output digit 28, the fourth password character "D" can be assigned to output digit 46, the fifth password character "E" can be assigned to output digit 37 and the sixth password character "F" can be assigned to output digit 16.

Figure 8:
FIG. 8 illustrates a complete encrypted character list with output digits, according to certain embodiments.

In certain embodiments, in the step XVI), the encrypted character list can be completed by assigning all kinds of the password characters to all of the unassigned output digits in random so that the number of each kind of the password characters assigned is equal to N. In certain embodiments, if B is established as 6, N is 8, the password characters is established "A", "B", "C", "D", "E", "F", "G", "H", "I", and "J", A is established as 3 and the password is decided as "ABCDEF", as illustrated in FIG. 8, the encrypted character list 3 can be completed by assigning all kinds of password characters (i.e., "A", "B", "C", "D", "E", "F", "G", "H", "I", and "J") to all unassigned output digits (i.e., other than 16, 28, 33, 37, 45, 46, 59 and 68) in random so that the number of each kind of the password characters (i.e., "A", "B", "C", "D", "E", "F", "G", "H", "I", and "J") assigned is equal to 8. As illustrated in FIG. 8, number of each of "A", "B", "C", "D", "E", "F", "G", "H", "I", and "J" in the encrypted character list 3 is 8.

Figure 9:
FIG. 9 illustrates a complete encrypted character list without output digits, according to certain embodiments.

In certain embodiments, the encrypted character list completed can be transferred to another apparatus. In certain embodiments, the encrypted character list can be transferred in the form of digital data. In certain embodiments, the encrypted character list can be transferred through a network, such as an internet, LAN and the like. In certain embodiments, the encrypted character list 3 with the output digit such as FIG. 8 can be transferred. In certain embodiments, the encrypted character list 31 without output digits such as FIG. 9 can be transferred.

Process of Decrypting a Password

In certain embodiments, a method for decrypting by a computer the password encrypted by the above encrypting method can comprises the following steps. i) A step of receiving the encrypted character list. ii) A step of storing the encryption table and the result of the correlating step (the correlation). iii) A step of deciding A' by detecting the password character from the encrypted character list. The password character can be assigned to the output digit of which number corresponds to the first number of the encryption table. iv) A step of changing A' into A according to the correlation. v) A step of deciding C' by detecting the password character from the encrypted character list. The password character can be assigned to the output digit of which number corresponds to the (A+2)th number of the encryption table. vi) A step of changing C' into C according to the correlation. vii) A step of deciding the first character of the password by detecting the password character from the encrypted character list. The password character can be assigned to the output digit of which number corresponds to the (A+3)th number of the encryption table. viii) A step of deciding all characters of the password other than the first character, which are the second character, the third character, . . . , the last character, by detecting each password character from the encrypted character list. Each of the password character can be assigned to the output digit of which number corresponds to the (A+4)th number, the (A+5)th number . . . (A+C+2)th number of the encryption table.

In certain embodiments, the above steps from i) to viii) can be conducted by a computer, a server, a printer comprising CPU, a printer controller for the printer, a network system comprising a computer and the like. In certain embodiments, the above steps from i) to viii) can be conducted by only one apparatus or several apparatuses which are separated.

In certain embodiments, at least one of the above steps from i) to viii) can be conducted by a computer program. In certain embodiments, the computer program to conduct at least one of the above steps from i) to viii) can be only one program or several program which are separated. In certain embodiments, the computer program to conduct at least one of the above steps from i) to viii) can be recorded in a compact disk (CD) (e.g., CD-ROM, CD-R, CD-RW etc.), a digital versatile disk (DVD) (e.g., DVD-ROM, DVD-R, DVD-RW, DVD+RW etc.), a hard disk or the like. In certain embodiments, the computer program to conduct at least one of the above steps from i) to viii) can be transferred through a network such as an internet or LAN and so on.

In certain embodiments, in the step i), the encrypted character list can be received. The encrypted character list can be produced by the encrypting method. In certain embodiments, the encrypted character list can be received in the form of digital data. In certain embodiments, the encrypted character list can be received through a network, such as an internet, LAN and the like. In certain embodiments, as illustrated in FIG. 8, the encrypted character list 3 with the output digit can be received. In certain embodiments, the encrypted character list 31 without output digits such as FIG. 9 can be received. In certain embodiments, if the encrypted character list without output digits such as FIG. 9 can be received, sequential numbers which start from 0 can be assigned to each password character of the encrypted character list.

In certain embodiments, in the step ii), the encryption table and the correlation can be stored. The encryption table can be built by the step V) of the above encrypting method. The contents of the encryption table used by the decrypting method is identical with the contents of the encryption table used by the encrypting method. The contents of the correlation used by the decrypting method is identical with the contents of the correlation used by the encrypting method. In certain embodiments, as illustrated in FIG. 2, the encryption table 2 can be stored. In certain embodiments, as illustrated in FIG. 1, the correlation 1 can be stored.

In certain embodiments, in the step iii), A' can be decided by detecting the password character from the encrypted character list. The password character can be assigned to the output digit of which number corresponds to the first number of the encryption table. A' is a corresponding character which is converted from A according to the correlation in the encrypting method. In certain embodiments, as illustrated in FIG. 2, the first number of the encryption table 1 is 33. As illustrated in FIG. 8, the password character assigned to output digit "33" in the encrypted character list 3 is "D". Therefore, A' can be decided as "D".

In certain embodiments, in the step iv), A' can be changed into A according to the correlation. A can be established in random in the encrypting method and can represent number which is from 0 to (M−1). In certain embodiments, as illustrated in FIG. 1, if A' is "D", "D" can be changed into 3 according to the correlation 1. Therefore, "D" as A' can be changed into 3 as A.

In certain embodiments, in the step v), C' can be decided by detecting the password character from the encrypted character list. The password character can be assigned to the output digit of which number corresponds to the (A+2)th number of the encryption table. C' is a corresponding character which is converted from C according to the correlation in the encrypting method. In certain embodiments, if A is 3, (A+2) can be 5. As illustrated in FIG. 2, the 5$^{th}$ number of the encryption table 1 is 68. As illustrated in FIG. 8, the password character assigned to output digit 68 in the encrypted character list 3 is "G". Therefore, C' can be decided as "G".

In certain embodiments, in the step vi), C' can be changed into C according to the correlation. C can represent the number of length of the decided password. In certain embodiments, as illustrated in FIG. 1, if C' is "G", "G" can be changed into "6" according to the correlation 1. Therefore, C can be "6". That is to say, the length of the decided password can be 6 characters.

In certain embodiments, in the step vii), the first character of the password can be decided by detecting the password character from the encrypted character list. The password character can be assigned to the output digit of which number corresponds to the (A+3)th number of the encryption table. In certain embodiments, if A is 3, (A+3) can be 6. As illustrated in FIG. 2, the sixth (6$^{th}$) number of the encryption table 1 is 45. As illustrated in FIG. 8, the password character assigned to output digit "45" in the encrypted character list 3 is "A". Therefore, the first character of the password can be decided as "A". If C is 6, the password is A?????.

In certain embodiments, in the step viii), all characters of the password other than the first character, which are the second character, the third character, . . . , the last character can be decided by detecting each password character from the encrypted character list. Each of the password character can be assigned to the output digit of which number corresponds to the (A+4)th number, the (A+5)th number, . . . , (A+C+2)th number of the encryption table. In certain embodiments, if A is 3 and C is 6, (A+C+2) can be 11 and (A+4) can be 7. Therefore, each of the password character can be assigned to the output digit of which number corresponds to the 7$^{th}$ number, the 8$^{th}$ number, the 9$^{th}$ number, the 10$^{th}$ number and the 11$^{th}$ number of the encryption table. As illustrated in FIG. 2, the 7$^{th}$ number, the 8$^{th}$ number, the 9$^{th}$ number, the 10$^{th}$ number and the 11$^{th}$ number of the encryption table 2 are 59, 28, 46, 37 and 16. As illustrated in FIG. 8, each of the password character assigned to output digit 59, 28, 46, 37 and 16 in the encrypted character list 3 is "B", "C", "D", "E" and "F". Therefore, the second character of the password can be decided as "B". The third character of the password can be decided as "C". The fourth character of the password can be decided as "D". The fifth character of the password can be decided as "E". The sixth character of the password can be decided as "F". Therefore, the password is decided as "ABC-DEF".

Password Encrypting Apparatus

In certain embodiments, the password encrypting apparatus can comprise a storing device, an input device, a password length detecting device, an establishing device, a converting device, an encrypted character list producing device and a transfer device.

In certain embodiments, the password encrypting apparatus can encrypt the password. In certain embodiments, the password encrypting apparatus can encrypt the password by the way described in the above PROCESS OF ENCRYPTING A PASSWORD. In certain embodiments, the password encrypting apparatus can be an integrated one device or can be separated in several devices. Examples of the password encrypting apparatus consistent with certain embodiments of the invention include, but are not limited to a personal computer, a server, a printer comprising a CPU, a printer controller for the printer and a combination thereof. Examples of the printer consistent with certain embodiments of the invention include, but not limited to, a laser beam printer, a multi-function printer including copying function (MFP), an ink jet printer, a thermal printer (e.g., dye sublimation printers) and a silver halide printer. In certain embodiments, the printer can comprise a print controller.

In certain embodiments, the storing device can store the following data. a) Data of the password characters. The password characters can be characters which can be used for the password. b) Data of M. M can represent number of kinds of the password characters. c) Data of correlation between each of the password characters and each number which is 0 to (M−1). d) Data of the encryption table. The encryption table can be filled with numbers which are from 0 to ((M×N)−1) in random order. B can represent number of maximum password length. N can represent number of (B+2) and be equal to or less than M. e) Data of output digits. The output digits can be the sequential numbers which are from 0 to ((M×N)−1).

In certain embodiments, the password characters can be established by the way described in the above PROCESS OF ENCRYPTING A PASSWORD. In certain embodiments, the password characters can be established when the program for the password encrypting process is produced, and the established password characters can be recorded with the program in the recording medium (e.g., CD such as CD-ROM, CD-R, CD-RW etc., DVD such as DVD-ROM, DVD-R, DVD-RW, DVD+RW etc., a magneto-optical (MO) disk and a digital memory card and the like) and the established password can be stored in the storing device when the program for the password encrypting process is installed. Alternatively, the password characters can be established by the password encrypting apparatus and the established password can be stored in the storing device.

In certain embodiments, M can be established by the way described in the above PROCESS OF ENCRYPTING A PASSWORD. In certain embodiments, M can be established by counting the number of kinds of the password characters established and/or stored in the storing device and established M can be stored in the storing device.

In certain embodiments, the correlation can be established by the way described in the above PROCESS OF ENCRYPTING A PASSWORD. In certain embodiments, the correlation can be established when the program for the password encrypting process is produced, and the established correlation can be recorded with the program in the recording medium (e.g., CD such as CD-ROM, CD-R, CD-RW etc., DVD such as DVD-ROM, DVD-R, DVD-RW, DVD+RW etc., a magneto-optical (MO) disk and a digital memory card and the like) and the established correlation can be stored in the storing device when the program for the password encrypting process is installed. Alternatively, the correlation can be established by the password encrypting apparatus and established correlation can be stored in the storing device.

In certain embodiments, B and N can be established by the way described in the above PROCESS OF ENCRYPTING A PASSWORD. In certain embodiments, B and N can be established when the program for the password encrypting process is produced, and the established B and N can be recorded with the program in the recording medium (e.g., CD such as CD-ROM, CD-R, CD-RW etc., DVD such as DVD-ROM, DVD-R, DVD-RW, DVD+RW etc., a magneto-optical (MO) disk and a digital memory card and the like) and the established B and N can be stored in the storing device when the program for the password encrypting process is installed. Alternatively, B and N can be established by the password encrypting apparatus according to user's instruction from the input device and the established B and N can be stored in the storing device. In certain embodiments, the encryption table can be built by the way described in the above PROCESS OF ENCRYPTING A PASSWORD. In certain embodiments, the encryption table can be built when the program for the password encrypting process is produced, and the built encryption table can be recorded with the program in the recording medium (e.g., CD such as CD-ROM, CD-R, CD-RW etc., DVD such as DVD-ROM, DVD-R, DVD-RW, DVD+RW etc., a magneto-optical (MO) disk and a digital memory card and the like) and the built encryption table can be stored in the storing device when the program for the password encrypting process is installed. Alternatively, the encryption table can be installed from the recording medium which records only the encryption table. Alternatively, the encryption table can be built by password encrypting apparatus and the built encryption table can be stored in the storing device.

In certain embodiments, the output digits can be established by the way described in the above PROCESS OF ENCRYPTING A PASSWORD. In certain embodiments, the output digits can be established by the sequential numbers which are from 0 to ((M×N)−1) and/or stored in the storing device.

Examples of the storing device consistent with certain embodiments of the invention include, but not limited to, a digital memory module, such as, a read only memory (ROM), a random access memory (RAM), a flash memory, or a hard disk, or a digital memory card reader and/or writer with a digital memory card, a compact disc (CD) reader and/or writer (e.g., for CD-R, CD-RW, etc.) with CD, a digital versatile disc (DVD) reader and/or writer (e.g., DVD-R, DVD-RW, DVD+RW, etc.) with DVD. Various types of digital memory cards compatible with certain embodiments of the invention include, but are not limited to, secure digital ("SD") memory cards, Compact Flash™, Smart Media™ and Memory Stick™.

In certain embodiments, the input device can input the password, such as "ABCDEF", "XDGRD345", "41947" and the like. Examples of the input device consistent with certain embodiments of the invention include, but not limited to, a keyboard, a touch panel and a mouse.

In certain embodiments, the password length detecting device can detect C. C can represent the number of length of the password input by the input device. If the password is "ABCDEF", C can be detected as 6. If the password is "XDGRD345", C can be detected as 8. Examples of the password length detecting device consistent with certain embodiments of the invention include, but not limited to, an integrated circuit (IC), an application specific integrated circuit (ASIC), a micro processor (MPU) and a central processing unit (CPU), with certain software if necessary.

In certain embodiments, the establishing device can establish A in random. A can represent number which is from 0 to (M−1) in random. In certain embodiments, when the establishing device establishes A, M can be read from the storing device and be sent to the establishing device. Examples of the establishing device consistent with certain embodiments of the invention include, but not limited to, IC, ASIC, MPU and CPU, with certain software if necessary.

In certain embodiments, the converting device can convert A into a corresponding character A' according to the data of correlation stored in the storing device. In certain embodiments, the converting device can convert C into a corresponding character C' according to the data of correlation stored in the storing device. In certain embodiments, when the converting device converts A into A' and/or C into C', the data of correlation can be read from the storing device and be sent to the converting device. Examples of the converting device consistent with certain embodiments of the invention include, but are not limited to, IC, ASIC, MPU and CPU, with certain software if necessary.

In certain embodiments, the encrypted character list producing device can produce the encrypted character list. The encrypted character list producing device can produce the encrypted character list by conducting at least a part of the following five steps. 1) Assigning A' to one output digit which corresponds to the first number of the encryption table. 2) Assigning C' to other output digit which corresponds to the (A+2)th number of the encryption table. 3) Assigning the first character of the password to other output digit which corresponds to the (A+3)th number of the encryption table. 4) Assigning all of the characters of the password other than the first character, which are the second character, the third character, . . . , and the last character of the password to other output digits which correspond to (A+4)th number, (A+5)th number . . . (A+C+2)th number of the encryption table. 5) Assigning all kinds of the password characters to all of the unassigned output digits in random so that the number of each kind of the password character assigned in the encrypted character list is equal to N. The detailed description regarding the above step can be referred to the above PROCESS OF ENCRYPTING A PASSWORD. Examples of the encrypted character list producing device consistent with certain embodiments of the invention include, but not limited to IC, ASIC, MPU and CPU, with certain software if necessary.

In certain embodiments, at least two of the password length detecting device, the establishing device, the converting device and the encrypted character list producing device can be one same device. In certain embodiments, the password length detecting device, the establishing device, the converting device and the encrypted character list producing device can be several separate devices.

In certain embodiments, the transfer device can transfer the encrypted character list produced by the encrypted character list producing device to another apparatus other than the password encrypting apparatus. The another apparatus can utilize the password, if decrypted. In certain embodiments, the transfer device can transfer the encrypted character list to another apparatus as digital data. In certain embodiments, the transfer device can transfer the encrypted character list to another apparatus through an internet, a local area network (LAN) and the like. Examples of the transfer device consistent with certain embodiments of the invention include, but not limited to, a network card, a modem, a LAN adapter and an infrared port.

Password Decrypting Apparatus

In certain embodiments, the password decrypting apparatus can comprise a receiving device, a storing device and a decrypting device.

In certain embodiments, the password decrypting apparatus can decrypt the encrypted password. In certain embodiments, the password decrypting apparatus can decrypt the password by the way described in the above PROCESS OF DECRYPTING A PASSWORD. In certain embodiments, the password decrypting apparatus can be an integrated one device or can be separated in several devices. Examples of the password decrypting apparatus consistent with certain embodiments of the invention include, but not limited to, a personal computer, a server, a printer comprising CPU, a printer controller for the printer and a combination thereof. Examples of the printer consistent with certain embodiments of the invention include, but not limited to, a laser beam printer, a multi-function printer including copying function (MFP), an ink jet printer, a thermal printer (e.g., dye sublimation printers) and a silver halide printer. In certain embodiments, the printer can comprise a print controller.

In certain embodiments, the receiving device can receive the encrypted character list produced by the password encrypting apparatus from another apparatus other than the password decrypting apparatus. In certain embodiments, the receiving device can receive the encrypted character list from another apparatus as digital data. In certain embodiments, the receiving device can receive the encrypted character list from another apparatus through an internet, LAN and the like. Examples of the receiving device consistent with certain embodiments of the invention include, but not limited to, a network card, a modem, a LAN adapter and an infrared port.

In certain embodiments, the storing device can store at least one of the following two data. a) Data of correlation between each of the password characters and each number which is 0 to (M−1). b) Data of the encryption table. The encryption table can be filled with numbers which are from 0 to ((M×N)−1) in random order. M can represent number of kinds of the password characters. B can represent number of maximum password length. N can represent number of (B+2) and be equal to or less than M.

In certain embodiments, the data of the encryption table and the data of the correlation can be stored in the storing device by the way described in the above PROCESS OF DECRYPTING A PASSWORD. In certain embodiments, the encryption table can be built when the program for the password encrypting process is produced, and the built encryption table can be recorded with the program in the recording medium (e.g., CD such as CD-ROM, CD-R, CD-RW etc., DVD, such as DVD-ROM, DVD-R, DVD-RW, DVD+RW etc., a magneto-optical (MO) disk and a digital memory card and the like) and the built encryption table can be stored in the storing device when the program for the password decrypting process is installed. Alternatively, the encryption table can be installed from the recording medium which records only the encryption table.

Examples of the storing device consistent with certain embodiments of the invention include, but not limited to, a digital memory module, such as, ROM, RAM, a flash memory, or a hard disk, or a digital memory card reader and/or writer with digital memory card, a compact disc (CD) reader and/or writer (e.g., for CD-R, CD-RW, etc.) with CD, a digital versatile disc (DVD) reader and/or writer (e.g., DVD-R, DVD-RW, DVD+RW, etc.) with DVD. Various types of digital memory cards compatible with certain embodiments of the invention include, but are not limited to, SD memory cards, Compact Flash™, Smart Media™ and Memory Stick™.

In certain embodiments, the decrypting device can decrypt the encrypted password. The decrypting device can decrypt the encrypted password by conducting at least a part of the following six steps. 1) Deciding A' by detecting the password character from the encrypted character list. The password character of A' can be assigned to the output digit of which number corresponds to the first number of the encryption table. 2) Changing A' into A according to the data of correlation. 3) Deciding C' by detecting the password character from the encrypted character list. The password character of C' can be assigned to the output digit of which number corresponds to the (A+2)th number of the encryption table. 4) Changing C' into C according to the data of the correlation. 5) Deciding the first character of the password by detecting the password character from the encrypted character list. The first character of the password can be assigned to the output digit of which number corresponds to the (A+3)th number of the encryption table. 6) Deciding all characters of the password other than the first character, which are the second character, the third character, . . . , the last character, by detecting each password character from the encrypted character list. Each of the character of the password can be assigned to the output digit of which number corresponds to the (A+4)th number, the (A+5)th number . . . (A+C+2)th number of the encryption table. The detailed description regarding the above step can be referred to the above PROCESS OF DECRYPTING A PASSWORD. Examples of the decrypted character list producing device consistent with certain embodiments of the invention include, but not limited to, IC, ASIC, MPU, and CPU, with certain software if necessary.

System

In certain embodiments, a system can comprise the password encrypting apparatus and the password decrypting apparatus. In certain embodiments, the password encrypting apparatus can encrypt the password by at least a part of the encrypting method as explained in the above PROCESS OF ENCRYPTING A PASSWORD. In certain embodiments, the password encrypting apparatus can transfer the encrypted password to the password decrypting apparatus through a network. In certain embodiments, the password decrypting apparatus can receive the encrypted password from the password encrypting apparatus through a network. In certain embodiments, the password decrypting apparatus can decrypt the encrypted password by at least a part of the decrypting method as explained in the above PROCESS OF DECRYPTING A PASSWORD. In certain embodiments, the password encrypting device can produce the encrypted character list by encrypting the password and transfer the encrypted character list to the password decrypting device. In certain embodiments, the password decrypting device can receive the encrypted character list from the password encrypting apparatus and obtain the password by decrypting the encrypted character list.

In certain embodiments, the system can comprise a network. Examples of the network consistent with certain embodiments of the invention include, but not limited to, an internet, a wide area network (WAN), and LAN. In certain embodiments, the transfer of digital data, such as the encrypted character list, can be conducted in accordance with certain protocol. Example of the protocol consistent with certain embodiments of the invention include, but not limited to, Hyper Text Transfer Protocol (HTTP). In certain embodiments, the system can comprise one or several server(s). Examples of the server consistent with certain embodiments of the invention include, but not limited to, a Lightweight Directory Access Protocol (LDAP) server. In certain embodiments, the system can comprise one or several personal computer(s). In certain embodiments, the system can comprise one or several printer(s). Examples of the printer consistent with certain embodiments of the invention include, but not limited to, a laser beam printer, a multi-function printer including copying function (MFP), an ink jet printer, a thermal printer (e.g., dye sublimation printers), and a silver halide printer. In certain embodiments, the printer can connect with a printer controller. In certain embodiments, the printer can connect to the network through the printer controller. In certain embodiments, the printer controller can control the printer.

Example 1

Figure 10:
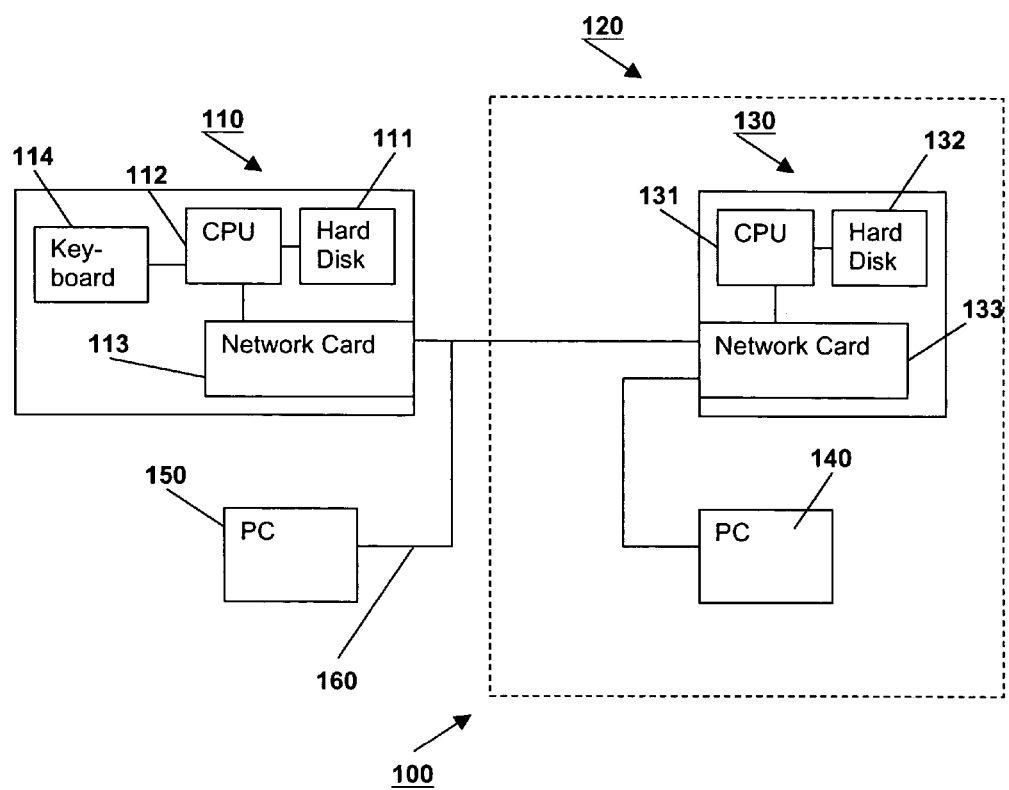
FIG. 10 illustrated a block diagram of a system comprising a personal computer as a password encryption apparatus and a server as a password decryption apparatus, according to certain embodiments.

In certain embodiments, as illustrated in FIG. 10, the system 100 can comprise the password encrypting apparatus (e.g., a personal computer 110), the password decrypting apparatus (e.g., a server 130), other personal computers 140 and 150, and a network cable of LAN 160.

In certain embodiments, as illustrated in FIG. 10, the password encrypting apparatus (e.g., the personal computer 110) can comprise the storing device (e.g., a hard disk 111), the input device (e.g., a keyboard 114), the password length detecting device (e.g., a CPU 112), the establishing device (e.g., the CPU 112), the converting device (e.g., the CPU 112), the encrypted character list producing device (e.g., the CPU 112), and the transfer device (e.g., a network card 113). In certain embodiments, software for encrypting the password can be installed in the personal computer 110.

In certain embodiments, as illustrated in FIG. 10, the password decrypting apparatus (e.g., the server 130) can comprise the receiving device (e.g., a network card 133), the storing device (e.g., a hard disk 132), and the decrypting device (e.g., a CPU 131). In certain embodiments, software for decrypting the password can be installed in the server 130.

In certain embodiments, secure network 120 comprising the server 130 and the personal computer 140 can have a good security of the digital data transferred in the secure network 120 against the outside. In certain embodiments, the security of the secure network 120 can be kept by a firewall and so on. Therefore, the digital data transferred between the server 130 and the personal computer 140 can keep a security. In certain embodiments, the personal computer 110 and the personal computer 150 can be outside of the secure network 120. Therefore, the digital data transferred between the server 130 and the personal computer 110, or the personal computers 110 and 150 or the personal computer 150 and the server 130 may not keep a security. For instance, the digital data transferred from the personal computer 110 to the server 130 may be intercepted by the personal computer 150.

In certain embodiments, the password characters can be stored in the hard disk 111 beforehand. The password characters can be characters which can be used for the password. In certain embodiments, the password characters can be established by the way described in the above PROCESS OF ENCRYPTING A PASSWORD. In certain embodiments, the password character can be "A", "B", "C", "D", "E", "F", "G", "H", "I", and "J" and the password character can be stored in the hard disk 111.

In certain embodiments, data of M can be stored in the hard disk 111. M can represent number of kinds of the password characters. In certain embodiments, M can be established by the way described in the above PROCESS OF ENCRYPTING A PASSWORD. In certain embodiments, M can be established as 10 by the personal computer 110, if the password characters are "A", "B", "C", "D", "E", "F", "G", "H", "I", and "J" and 10 as M can be stored in the hard disk 111.

In certain embodiments, the data of correlation between each of the password characters and each number which is 0 to (M−1) can be stored in the hard disk 111 beforehand. In certain embodiments, the correlation can be established by the way described in the above PROCESS OF ENCRYPTING A PASSWORD. In certain embodiments, as illustrated in FIG. 1, the password characters ("A", "B", "C", "D", "E", "F", "G", "H", "I", and "J") can be correlated to each number which is 0 to 9 because M is 10 and (M−1) is 9 and the correlation 1 of FIG. 1 can be stored in the hard disk 111.

In certain embodiments, the data of the encryption table can be stored in the hard disk 111 beforehand. The encryption table is filled with numbers which are from 0 to ((M×N)−1) in random order. In certain embodiments, B and N can be established by the way described in the above PROCESS OF ENCRYPTING A PASSWORD. In certain embodiments, the encryption table can be built by the way described in the above PROCESS OF ENCRYPTING A PASSWORD. In certain embodiments, if M is 10 and N is 8, ((M×N)−1) is 79 and the encryption table 2 can be built, as illustrated in FIG. 2, by filling the encryption table 2 with the numbers from 0 to 79 in random. In certain embodiments, the encryption table 2 can be recorded in the recording medium (e.g., CD such as CD-ROM, CD-R, CD-RW, etc., DVD such as DVD-ROM, DVD-R, DVD-RW, DVD+RW, etc., a magneto-optical (MO) disk, and a digital memory card and the like) and can be read from the recording medium by the personal computer 110 and can be stored in the hard disk 111.

In certain embodiments, the data of the output digits can be stored in the hard disk 111. In certain embodiments, the output digits can be established by the way described in the above PROCESS OF ENCRYPTING A PASSWORD. In certain embodiments, as illustrated in FIG. 6, output digits can be established as the sequential numbers which are from 0 to 79 if M is 10 and N is 8 (B is 6) and output digits can be recorded in the hard disk 111.

In certain embodiments, the password can be input by the input device (e.g., the keyboard 114). In certain embodiments, the password can be decided by the way described in the above PROCESS OF ENCRYPTING A PASSWORD. In certain embodiments, the password can be decided as "ABCDEF" if the password characters are "A", "B", "C", "D", "E", "F", "G", "H", "I", and "J" and B is 6. In certain embodiments, the password can be stored in the hard disk 111.

In certain embodiments, the length of the password input by the keyboard 114 can be detected by the password length detecting device (e.g., the CPU 112 with software). The length of the password can be C. In certain embodiments, the length of the password can be detected by the way described in the above PROCESS OF ENCRYPTING A PASSWORD. In certain embodiments, C can be decided as 6 if the password is "ABCDEF".

In certain embodiments, A can be established in random by the establishing device (e.g., the CPU 112 with software). A can represent a number which is from 0 to (M−1) in random. In certain embodiments, A can be established by the way described in the above PROCESS OF ENCRYPTING A PASSWORD. In certain embodiments, A can be from 0 to 9 if M is 10. In certain embodiments, A can be established as 3 as a result of random establishing when M is 10. In certain embodiments, A can be stored in the hard disk 111.

In certain embodiments, A can be converted into the corresponding character A' by the converting device (e.g., the CPU 112 with the software) according to the correlation stored in the hard disk 111. In certain embodiments, C can be converted into the corresponding character C' by the converting device (e.g., the CPU 112 with software) according to the correlation stored in the hard disk 111. In certain embodiments, A and C can be converted into the corresponding character A' and C' by the way described in the above PROCESS OF ENCRYPTING A PASSWORD. In certain embodiments, as illustrated in FIG. 1, 3 as A can be converted into "D" as A' by CPU 112 according to the correlation 1 stored in the hard disk 111. In certain embodiments, as illustrated in FIG. 1, 6 as C can be converted into "G" as C' by CPU 112 according to the correlation 1 stored in the hard disk 111.

In certain embodiments, the encrypted character list can be produced by the encrypted character list producing device (e.g., the CPU 112 with software) based on A' and C' converted by the CPU 112 and the output digits and the encryption table stored in the hard disk 111. In certain embodiments, the encrypted character list can be produced by the described stated in the above PROCESS OF ENCRYPTING A PASSWORD. In certain embodiments, A' converted by the CPU 112 can be assigned to one output digit which corresponds to the first number of the encryption table by the CPU 112. In certain embodiments, as illustrated in FIG. 2, the $1^{st}$ number of the encryption table 2 stored in the hard disk 111 is 33. In certain embodiments, as illustrated in FIG. 3, "D" as A' can be assigned to 33 by the CPU 112, if A is established as 3 by the CPU 112 and A' is "D". In certain embodiments, C' converted by the CPU 112 can be assigned to one output digit which corresponds to the (A+2)th number of the encryption table by the CPU 112. In certain embodiments, as illustrated in FIG. 2, the (A+2)th number of the encryption table 2 stored in the hard disk 111 is 68 if A is established as 3 by the CPU 112. In certain embodiments, as illustrated in FIG. 4, "G" as C' can be assigned to 68 by the CPU 112 if the password is input as "ABCDEF" by the keyboard 114, C is detected as 6 by the CPU 112, C' is "G" and A is established as 3 by the CPU 112. In certain embodiments, as illustrated in FIG. 7, "G" can be assigned to output digit of 68 by the CPU 112 if the password is "ABCDEF", C is detected as 6, C' is "G" and A is established as 3. In certain embodiments, the first character of the password can be assigned to another output digit which corresponds to the (A+3)th number of the encryption table by the CPU 112. In certain embodiments, as illustrated in FIG. 2, the (A+3)th number of the encryption table 2 stored in the hard disk 111 is 45 if A is established as 3 by the CPU 112. In certain embodiments, as illustrated in FIG. 5, "A," which is the first character of the password "ABCDEF" input by the keyboard 114, can be assigned to 45 by the CPU 112 if A is established as 3 by the CPU 112. In certain embodiments, as illustrated in FIG. 7, "A," which is the first character of the password "ABCDEF", can be assigned to output digit of 45 by the CPU 112 if A is established as 3. In certain embodiments, all of the characters of the password other than the first character, which are the second character, the third character . . . and the last character of the password input by the keyboard 114 can be assigned by the CPU 112 to other output digits which corresponds to (A+4)th number, (A+5)th number . . . and (A+C+2)th number of the encryption table stored in the hard disk 111. In certain embodiments, (A+4) is 7 and (A+C+2) is 11, if A is established as 3 by the CPU 112, the password is "ABCDEF" input by the keyboard 114 and C is 6 detected by the CPU 112. In certain embodiments, as illustrated in FIG. 2, if A is established as 3, the password is "ABCDEF" and C is detected as 6, the (A+4)th number, the (A+5)th number . . . the (A+C+2)th number of the encryption table can be the $7^{th}$ number, $8^{th}$ number, $9^{th}$ number, $10^{th}$ number and $11^{th}$ number. In certain embodiments, as illustrated in FIG. 2, the $7^{th}$ number, $8^{th}$ number, $9^{th}$ number, $10^{th}$ number, and $11^{th}$ number of the encryption table 2 is 59, 28, 46, 37, and 16. In certain embodiments, as illustrated in FIG. 5, if A is established as 3, the password is decided as "ABCDEF" and C is 6, the second password character "B" can be assigned to 59, the third password character "C" can be assigned to 28, the fourth password character "D" can be assigned to 46, the fifth password character "E" can be assigned to 37, and the sixth password character "F" can be assigned to 16 by the CPU 112. In certain embodiments, as illustrated in FIG. 7, if A is established as 3, the password is decided as "ABCDEF" and C is detected as 6, the second password character "B" can be assigned to output digit 59, the third password character "C" can be assigned to output digit 28, the fourth password character "D" can be assigned to output digit 46, the fifth password character "E" can be assigned to output digit 37, and the sixth password character "F" can be assigned to output digit 16 by the CPU 112. In certain embodiments, the encrypted character list can be completed by the CPU 112 by assigning all kinds of the password characters to all of the unassigned output digits in random so that the number of each kind of the password characters assigned in the encrypted character list is equal to N. In certain embodiments, if B is stored as 6 in the hard disk 111, N is 8, the password characters are stored as "A", "B", "C", "D", "E", "F", "G", "H", "I", and "J" in the hard disk 111, A is established as 3 by the CPU 112 and the password is input as "ABCDEF" by the keyboard 114, as illustrated in FIG. 8, the encrypted character list 3 can be completed by the CPU 112 by assigning all kinds of password characters (i.e., "A", "B", "C", "D", "E", "F", "G", "H", "I", and "J") to all unassigned output digits (i.e., other than 16, 28, 33, 37, 45, 46, 59, and 68) in random so that the number of each kind of the password characters (i.e., "A", "B", "C", "D", "E", "F", "G", "H", "I", and "J") assigned in the encrypted character list 3 is equal to 8. As illustrated in FIG. 8, number of each of "A", "B", "C", "D", "E", "F", "G", "H", "I", and "J" in the encrypted character list 3 is 8.

In certain embodiments, as illustrated in FIG. 10, the completed encrypted character list 3 can be transferred as digital data by the transfer device (e.g., the network card 113) from the password encrypting apparatus (e.g., the personal computer 110) to another apparatus (e.g., the server 130) through the network (e.g., a network cable of LAN 160 and the secure network 120).

In certain embodiments, as illustrated in FIG. 10, the personal computer 110 and the personal computer 150 can be outside of the secure network 120. Therefore, the encrypted character list 3 for the password transferred from the personal computer 110 to the server 130 may be intercepted by the personal computer 150. However, since the encrypted character list 3 cannot be decrypted by the personal computer 150, the security of the password can be kept.

In certain embodiments, the digital data of the completed encrypted character list 3 can be received by the password decrypting apparatus (e.g., the server 130). In certain embodiments, the encrypted character list 3 can be received by the receiving device (e.g., the network card 133) of the server 130. In certain embodiments, the encrypted character list can be received by the way described in the above PROCESS OF DECRYPTING A PASSWORD.

In certain embodiments, as illustrated in FIGS. 1 and 2, the data of the encryption table 2 and the data of the correlation 1 can be stored in the storing device (e.g., the hard disk 132) of the password decrypting apparatus (e.g., the server 130) beforehand. In certain embodiments, the data of the encryption table and the data of the correlation stored in the hard disk 132 of the password decrypting apparatus (e.g., server 130) are identical with the data of the encryption table and the data of the correlation stored in the hard disk 111 of the password encrypting apparatus (e.g., the personal computer 110). In certain embodiments, the data of the encryption table and the data of the correlation can be stored in the storing device by the way described in the above PROCESS OF DECRYPTING A PASSWORD.

In certain embodiments, the encrypted password can be decrypted by the decrypting device (e.g., the CPU 131) by decrypting the encrypted character list based on the encryption table and the correlation stored in the hard disk 132. In certain embodiments, the encrypted password can be decrypted by decrypting the encrypted character list based on the encryption table and the correlation by the way described in the above PROCESS OF DECRYPTING A PASSWORD. In certain embodiments, as illustrated in FIGS. 8 and 10, A' can be decided by the CPU 131 by detecting the password character from the encrypted character list 3 received by the network card 133. The password character can be assigned to the output digit of which number corresponds to the first number of the encryption table. A' is a corresponding character which is converted from A according to the data of the correlation in the encrypting method. In certain embodiments, as illustrated in FIG. 2, the first number of the encryption table 2 stored in the hard disk 132 is 33. As illustrated in FIG. 8, the password character assigned to output digit 33 in the encrypted character list 3 received by the network card 133 is "D". Therefore, A' can be decided as "D" by the CPU 131. In certain embodiments, A' can be changed into A by the CPU 131 according to the data of the correlation stored in the hard disk 132. A can be established in random in the encrypting method and can represent a number which is from 0 to (M−1). In certain embodiments, as illustrated in FIG. 1, if A' is decided as "D" by the CPU 131, "D" can be changed into 3 by the CPU 131 according to the data of the correlation 1 stored in the hard disk 111. Therefore, "D" as A' can be changed into 3 as A by the CPU 131. In certain embodiments, C' can be decided by the CPU 131 by detecting the password character from the encrypted character list received by the network card 133. The password character can be assigned to the output digit of which number corresponds to the (A+2)th number of the encryption table. C' is a corresponding character which is converted from C according to the data of correlation in the encrypting method. In certain embodiments, if "D" as A' is changed into 3 as A by the CPU 131, (A+2) can be 5. As illustrated in FIG. 2, the 5$^{th}$ number of the encryption table 2 stored in the hard disk 132 is 68. As illustrated in FIG. 8, the password character assigned to output digit 68 in the encrypted character list 3 received by the network card 133 is "G". Therefore, C' can be decided as "G" by the CPU 131. In certain embodiments, C' can be changed into C by the CPU 131 according to the data of correlation stored in the hard disk 132. C can represent the number of length of the decided password. In certain embodiments, as illustrated in FIG. 1, if C' is decided as "G" by the CPU 131, "G" as C' can be changed into 6 as C by the CPU 131 according to the data of the correlation 1 stored in the hard disk 132. Therefore, "G" as C' can be changed into 6 as C by the CPU 131. That is to say, the length of the decided password can be 6 characters. In certain embodiments, the first character of the password can be decided by the CPU 131 by detecting the password character from the encrypted character list received by the network card 133. The password character can be assigned to the output digit of which number corresponds to the (A+3)th number of the encryption table. In certain embodiments, if "D" as A' is changed into 3 as A by the CPU 131, (A+3) can be 6. As illustrated in FIG. 2, the 6$^{th}$ number of the encryption table 2 stored in the hard disk 132 is 45. As illustrated in FIG. 8, the password character assigned to output digit 45 in the encrypted character list 3 received by the network card 133 is "A". Therefore, the first character of the password can be decided as "A" by the CPU 131. If C is 6, the password is A?????. In certain embodiments, all characters of the password other than the first character, which are the second character, the third character, . . . , the last character of the password can be decided by the CPU 131 by detecting each password character from the encrypted character list 3 received by the network card 133. Each of the password characters can be assigned to the output digit of which number corresponds to the (A+4)th number, the (A+5)th number, . . . , (A+C+2)th number of the encryption table. In certain embodiments, if "D" as A' is changed into 3 as A by the CPU 131 and "G" as C' is changed into 6 as C by the CPU 131, (A+C+2) can be 11 and (A+4) can be 7. Therefore, each of the password characters can be assigned to the output digit of which number corresponds to the 7$^{th}$ number, the 8$^{th}$ number, the 9$^{th}$ number, the 10$^{th}$ number, and the 11$^{th}$ number of the encryption table. As illustrated in FIG. 2, the 7$^{th}$ number, 8$^{th}$ number, 9$^{th}$ number, 10$^{th}$ number, and 11$^{th}$ number of the encryption table 2 stored in the hard disk 132 are 59, 28, 46, 37, and 16. As illustrated in FIG. 8, the password character assigned to output digit 59, 28, 46, 37, and 16 in the encrypted character list 3 received by the network card 133 is "B", "C", "D", "E" and "F". Therefore, the second character of the password can be decided as "B" by the CPU 131. The third character of the password can be decided as "C" by the CPU 131. The fourth character of the password can be decided as "D" by the CPU 131. The fifth character of the password can be decided as "E" by the CPU 131. The sixth character of the password can be decided as "F" by the CPU 131. Therefore, the password is decrypted as "ABCDEF" by the CPU 131 of the server 130.

In certain embodiments, the decrypted password (e.g., "ABCDEF") can be transferred from the password decrypting apparatus (e.g., the server 130) to another apparatus (e.g., the personal computer 140) which can utilize the password. In certain embodiments, since the server 130 and the personal computer 140 are within the secure network 120, the security of the decrypted password transferred from the server 130 to the personal computer 140 can be kept.

In certain embodiments, the password can be input in the personal computer 110, the password can be encrypted by the personal computer 110, and the encrypted password can be transferred from the personal computer 110 to the server 130. In certain embodiments, the encrypted password can be received by the server 130, the encrypted password can be decrypted by the server 130 and the decrypted password can be sent from the server 130 to the personal computer 140. In certain embodiments, the personal computer 140 can store data of the correct password and the personal computer 140 can judge whether the password sent from the personal computer 110 through the server 130 is the correct password or not by comparing the password sent with the correct password stored in the personal computer 140. In certain embodiments, after the personal computer 140 judges that the password sent from the personal computer 110 is correct password, the personal computer 140 can be operated according to the instruction of the personal computer 110 and/or the personal computer 110 can access the data stored in the personal computer 140. In certain embodiments, after the personal computer 140 judges that the password sent from the personal computer 110 is not the correct password, the personal computer 140 cannot be operated according to the instruction of the personal computer 110 and/or the personal computer 110 cannot access the data stored in the personal computer 140.

Example 2

Figure 11:
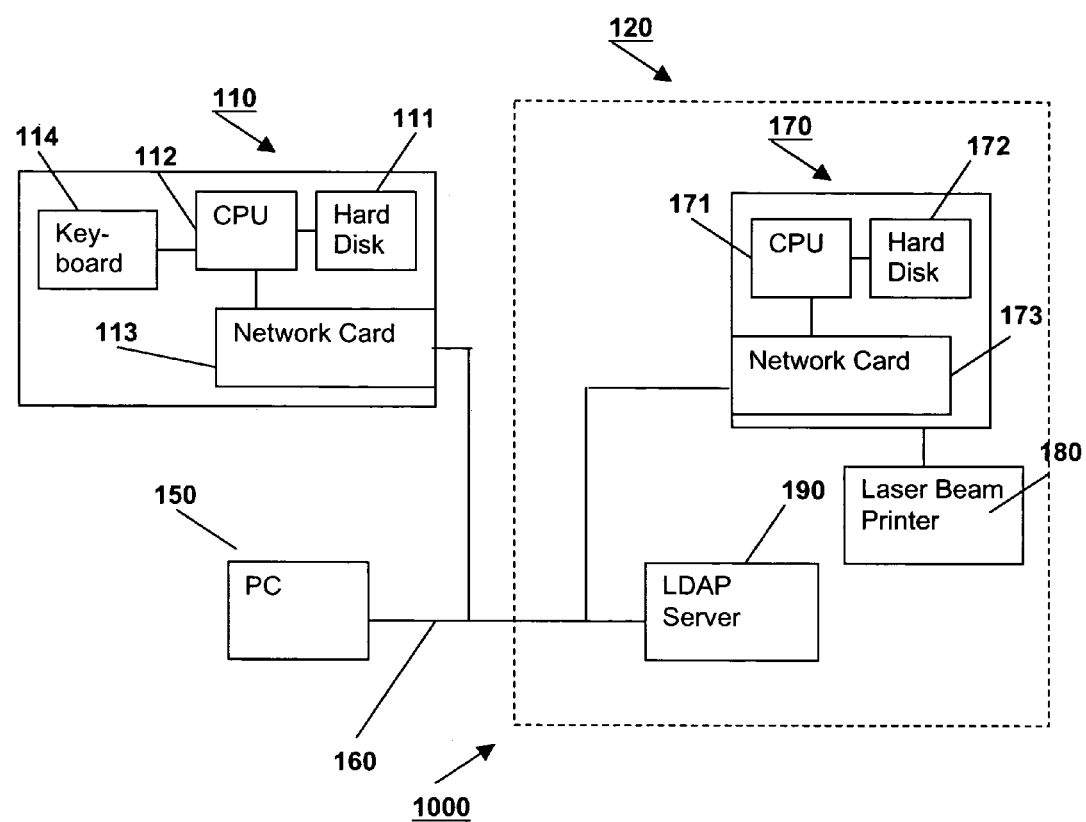
FIG. 11 illustrated a block diagram of a system comprising a personal computer as a password encryption apparatus and a printer controller as a password decryption apparatus, according to certain embodiments.

In certain embodiments, as illustrated in FIG. 11, the system can comprise the password encrypting apparatus (e.g., a personal computer 110), the password decrypting apparatus (e.g., a printer controller 170), a laser beam printer 180 connecting with the printer controller 170, an LDAP server 190, another personal computer 150, and a network cable of LAN 160. In certain embodiments, as illustrated in FIG. 11, the several apparatuses can be connected with each other through the LAN under an environmental of HTTP.

In certain embodiments, as illustrated in FIG. 11, the password encrypting apparatus (e.g., the personal computer 110) can comprise the storing device (e.g., a hard disk 111), the input device (e.g., the keyboard 114), the password length detecting device (e.g., a CPU 112), the establishing device (e.g., the CPU 112), the converting device (e.g., the CPU 112), the encrypted character list producing device (e.g., the CPU 112), and the transfer device (e.g., a network card 113). In certain embodiments, software for encrypting the password can be installed in the personal computer 110.

In certain embodiments, as illustrated in FIG. 11, the password decrypting apparatus (e.g., the printer controller 170) can comprise the receiving device (e.g., a network card 173), the storing device (e.g., a hard disk 172), and the decrypting device (e.g., a CPU 171). In certain embodiments, software for decrypting the password can be installed in the printer controller 170.

In certain embodiments, secure network 120 comprising the printer controller 170 with the laser beam printer 180, and the LDAP server 190 can have a good security of the digital data transferred in the secure network 120 against the outside. In certain embodiments, the security of the secure network 120 can be kept by a firewall and so on. Therefore, the digital data transferred among the printer controller 170, the laser beam printer 180 and the LDAP server 190 can keep a security. In certain embodiments, the personal computer 110 and the personal computer 150 can be outside of the secure network 120. Therefore, the digital data transferred between the printer controller 170 and the personal computer 110, the personal computer 110 and the LDAP server 190, or the personal computer 150 and the printer controller 170 may not keep a security. For instance, the digital data transferred from the personal computer 110 to the printer controller 170 may be intercepted by the personal computer 150.

In certain embodiments, the printer controller 170 can generate web pages. In certain embodiments, a software of web browser can be installed in the personal computer 110. In certain embodiments, the personal computer 110 with the web browser can link the web page generated by the print controller 170 through the network cable of LAN 160 and the web page can be displayed on the display device (e.g., CRT monitor and the like) (not shown in FIG. 11) of the personal computer 110. In certain embodiments, the message, such as "PLEASE ENTER YOUR IP ADDRESS, ACCOUNT NUMBER AND PASSWORD" can be displayed on the web page on the display device. In certain embodiments, a user can input the user's IP address, account number, and password (e.g., "ABCDEF") by the keyboard 114. In certain embodiments, the password ("ABCDEF") can be encrypted by the personal computer 110 by the way described in the above EXAMPLE 1 and the encrypted character list 3 of FIG. 8 can be produced.

In certain embodiments, the completed encrypted character list 3 can be transferred as digital data by the transfer device (e.g., the network card 113) from the password encrypting apparatus (e.g., the personal computer 110) to another apparatus (e.g., the printer controller 170) through the network (e.g., a network cable of LAN 160 and the secure network 120).

In certain embodiments, as illustrated in FIG. 11, the personal computer 110 and the personal computer 150 can be outside of the secure network 120. Therefore, the encrypted character list 3 for the password transferred from the personal computer 110 to the printer controller 170 may be intercepted by the personal computer 150. However, since the encrypted character list 3 cannot be decrypted by the personal computer 150, the security of the password can be kept.

In certain embodiments, the digital data of the completed encrypted character list 3 can be received by the password decrypting apparatus (e.g., the printer controller 170). In certain embodiments, the encrypted character list 3 can be received by the receiving device (e.g., the network card 173) of the printer controller 170. In certain embodiments, the encrypted character list can be received by the way described in the above PROCESS OF DECRYPTING A PASSWORD.

In certain embodiments, the encrypted character list 3 received by the printer controller 170 can be decrypted by the printer controller 170 by the way described in the above EXAMPLE 1 except that each of the print controller 170, the CPU 171, the hard disk 172, and the network card 173 can substitute for each of the server 130, the CPU 131, the hard disk 132, and the network card 133 in the EXAMPLE 1. And, the decrypted password "ABCDEF" can be obtained by the printer controller 170.

In certain embodiments, the decrypted password "ABCDEF" can be transferred from the password decrypting apparatus (e.g., the printer controller 170) to another apparatus (e.g., the LDAP server 190) which can utilize the password. In certain embodiments, since the printer controller 170 and the LDAP server 190 are within the secure network 120, the security of the decrypted password transferred from the printer controller 170 to the LDAP server 190 can be kept.

In certain embodiments, in advance the user can register in the LDAP server 190 by recording the user's IP address, account number, and password which the user decides in the LDAP server. In certain embodiments, the LDAP server 190 can store the data of the user's IP address, account number, and correct password corresponding to the user's IP address and the account number beforehand. In certain embodiments, the LDAP server 190 can judge whether the password sent from the personal computer 110 through the print controller 170 is the correct password or not by comparing the password sent with the correct password stored in the LDAP server 190. In certain embodiments, after the LDAP server 190 judges that the password sent from the personal computer 110 is the correct password, the LDAP server 190 can allow the personal computer 110 to operate the printer controller 170 and the laser beam printer 180 from the personal computer 110. For instance, the user can create a customized "one touch button" to be displayed on a display of the laser beam printer 180 by instructing the laser beam printer 180 through the LDAP server 190 and the printer controller 170 from the user's personal computer 110. Since several instructions of operation can be included in the one touch button, the complicated operation of the laser beam printer 180 can be simplified and the speed of operation of the laser beam printer 180 can be expedited. In certain embodiments, after the LDAP server 190 judges that the password sent from the personal computer 110 is not the correct password, the LDAP server 190 cannot allow the personal computer 110 to operate the printer controller 170 from the personal computer 110.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for encrypting a password by a computer, comprising:

establishing password characters which are characters which can be used for the password, establishing M that represents number of kinds of the password characters, establishing B that represents number of maximum password length and N that represents number of (B+2), N being equal to or less than M, correlating each of the password characters to each number which is 0 to (M−1), building an encryption table which is filled with numbers which are from 0 to ((M×N)−1) in random order, deciding the password, detecting C that represents the number of length of the decided password, establishing A that represents number which is from 0 to (M−1) in random, converting A into a corresponding character A' according to the result of correlating step, converting C into a corresponding character C' according to the result of correlating step, establishing output digits which are the sequential numbers which are from 0 to ((M×N)−1)

assigning A' to one output digit which corresponds to the first number of the encryption table, assigning C' to other output digit which corresponds to the (A+2)th number of the encryption table, assigning the first character of the password to other output digit which corresponds to the (A+3)th number of the encryption table, assigning all of the characters of the password other than the first character, which are the second character, the third character . . . and the last character of the password to other output digits which correspond to (A+4)th number, (A+5)th number . . . and (A+C+2)th number of the encryption table, completing an encrypted character list by assigning all kinds of the password characters to all of the unassigned output digits in random so that the number of each kind of the password characters assigned in the encrypted character list is equal to N, and transferring the encrypted character list to another apparatus.

2. A method for decrypting by a computer the password encrypted by the method of claim 1, comprising:

receiving the encrypted character list, storing the encryption table and the result of the correlating step, deciding A' by detecting the password character from the encrypted character list, the password character being assigned to the output digit of which number corresponds to the first number of the encryption table, changing A' into A according to the result of the correlating step, deciding C' by detecting the password character from the encrypted character list, the password character being assigned to the output digit of which number corresponds to the (A+2)th number of the encryption table, changing C' into C according to the result of the correlating step, deciding the first character of the password by detecting the password character from the encrypted character list, the password character being assigned to the output digit of which number corresponds to the (A+3)th number of the encryption table, and deciding all characters of the password other than the first character, which are the second character, the third character, . . . , the last character, by detecting each password character from the encrypted character list, each of the password character characters being assigned to the output digit of which number corresponds to the (A+4)th number, the (A+5)th number . . . (A+C+2)th number of the encryption table.

3. A password encrypting apparatus which encrypts a password, comprising:

a storing device which stores data of password characters which are characters which can be used for the password, data of M that represents number of kinds of the password characters, data of correlation between each of the password characters and each number which is 0 to (M−1), data of an encryption table which is filled with numbers which are from 0 to (M×N−1) in random order, N representing number of (B+2) and being equal to or less than M, B representing number of maximum password length, and data of output digits which are the sequential numbers which are from 0 to ((M X an input device which inputs the password, a password length detecting device which detects C that represents the number of length of the password input by the input device, an establishing device which establishes A that represents number which is from to (M−1) in random, a converting device which converts A into a corresponding character A' according to the correlation, and converts C into a corresponding character C' according to the correlation, an encrypted character list producing device which produces an encrypted character list by assigning A' to one output digit which corresponds to the first number of the encryption table, assigning C' to other output digit which corresponds to the (A+2)th number of the encryption table, assigning the first character of the password to other output digit which corresponds to the (A+3)th number of the encryption table, assigning all of the characters of the password other than the first character, which are the second character, the third character . . . and the last character of the password to other output digits which correspond to (A+4)th number, (A+5)th number . . . and (A+C+2)th number of the encryption table, and assigning all kinds of the password characters to all of the unassigned output digits in random so that the number of each kind of the password characters assigned in the encrypted character list is equal to N, and a transfer device which transfers the encrypted character list produced by the encrypted character list producing device to another apparatus.

4. A password decrypting apparatus which decrypts the password encrypted by the apparatus of claim 3, comprising:
 a receiving device which receives the encrypted character list,
 a storing device which stores the data of the encryption table and the data of the correlation,
 a decrypting device which decrypts the encrypted character list by
 deciding A' by detecting the password character from the encrypted character list, the password character being assigned to the output digit of which number corresponds to the first number of the encryption table,
 changing A' into A according to the data of the correlation,
 deciding C' by detecting the password character from the encrypted character list, the password character being assigned to the output digit of which number corresponds to the (A+2)th number of the encryption table,
 changing C' into C according to the data of the correlation,
 deciding the first character of the password by detecting the password character from the encrypted character list, the password character being assigned to the output digit of which number corresponds to the (A+3)th number of the encryption table, and
 deciding all characters of the password other than the first character, which are the second character, the third character, . . . , the last character, by detecting each password character from the encrypted character list, each of the password character being assigned to the output digit of which number corresponds to the (A+4)th number, the (A+5)th number . . . (A+C+2)th number of the encryption table.

5. The method of claim 1, wherein the encryption table is populated with unique numbers, different form each other.

6. The apparatus of claim 3, wherein the numbers of the encryption table are unique and different form each other.

* * * * *